July 20, 1926.
H. B. SCOTT
INDUSTRIAL TRUCK
Filed March 20, 1922   4 Sheets-Sheet 1
1,593,194
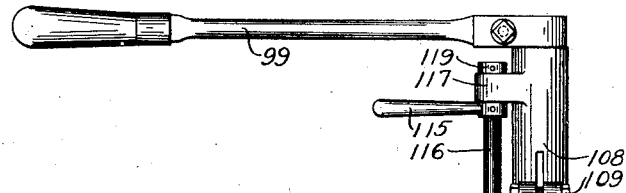
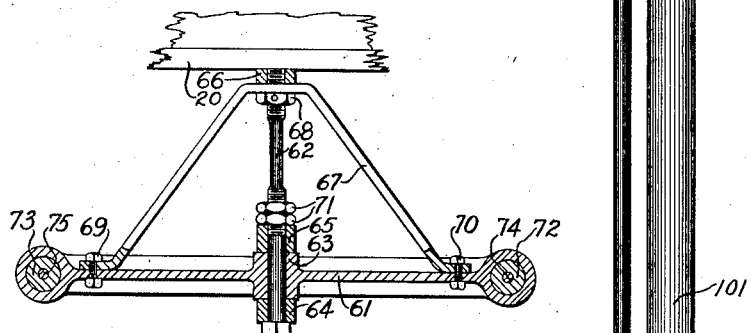
FIG. 8
FIG. 1
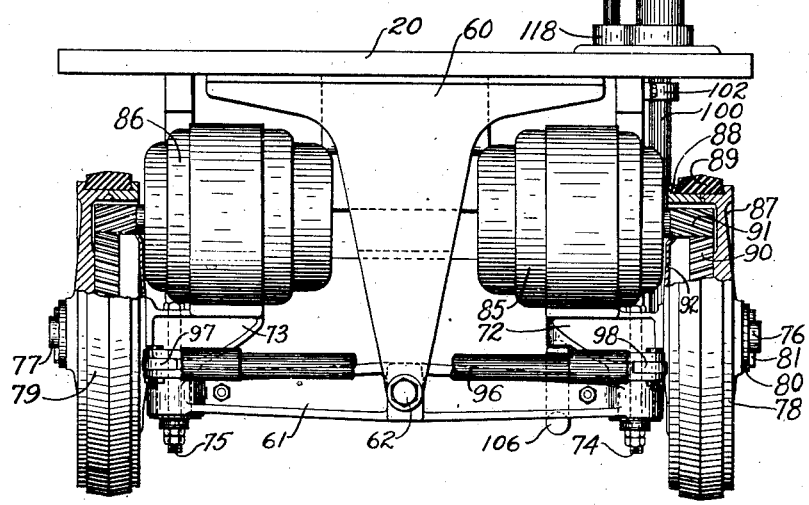
Inventor
Howard B. Scott
By

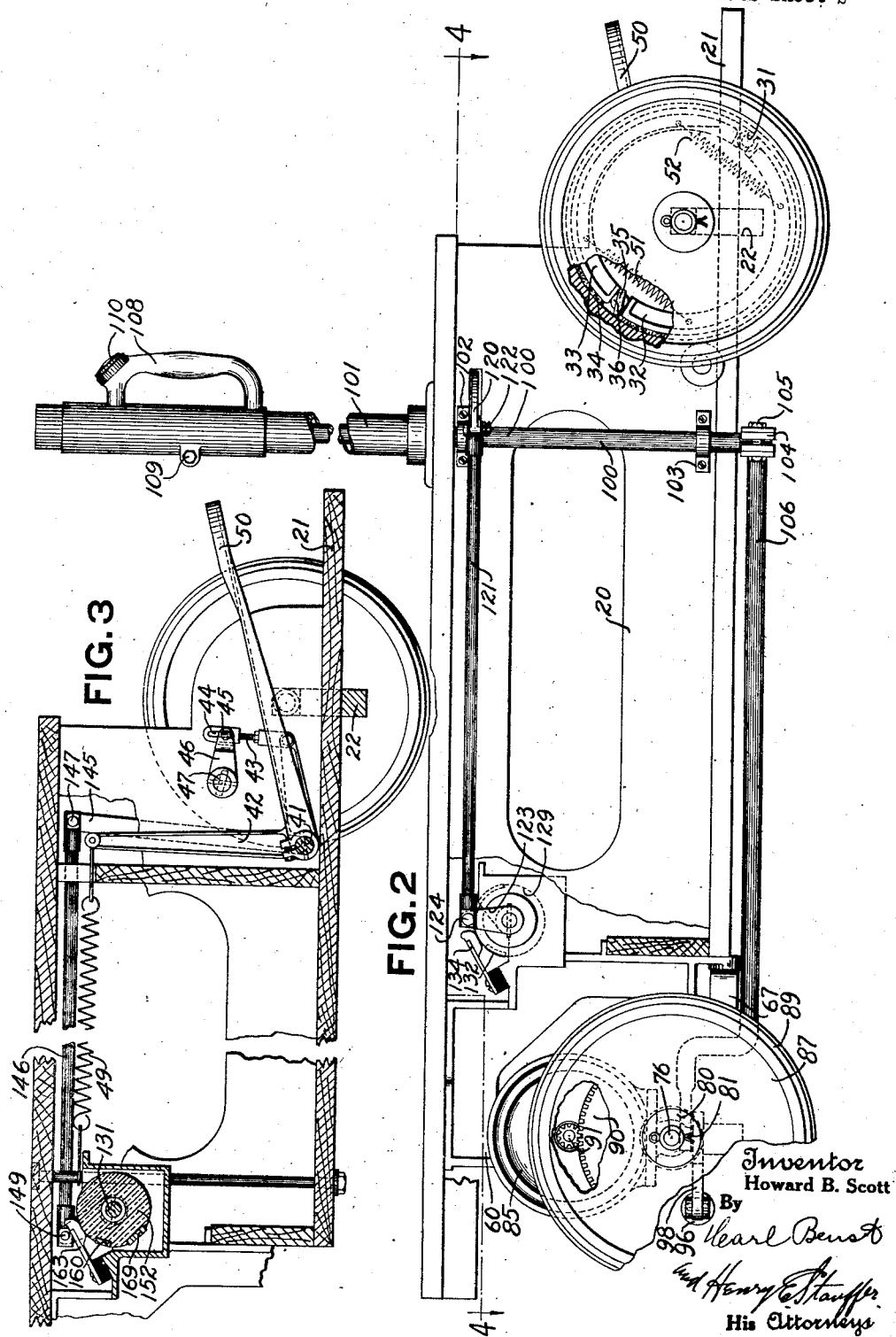

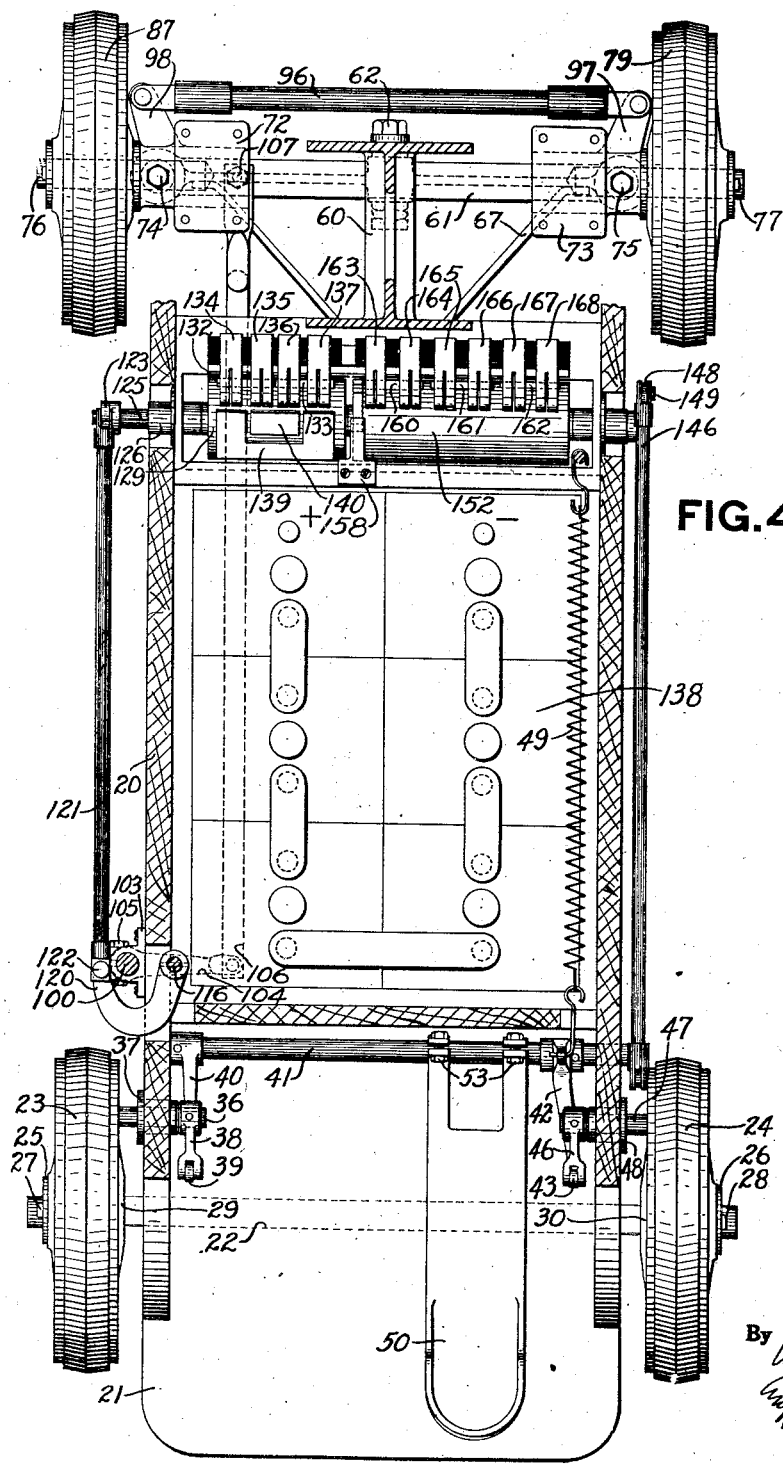

July 20, 1926.
H. B. SCOTT
1,593,194
INDUSTRIAL TRUCK
Filed March 20, 1922     4 Sheets-Sheet 4
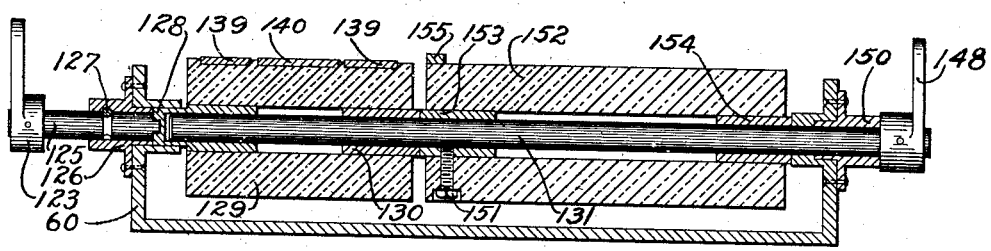
FIG. 6     FIG. 5
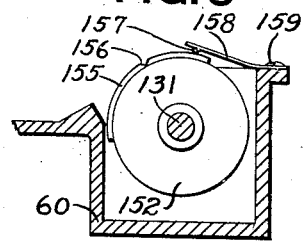
FIG. 7
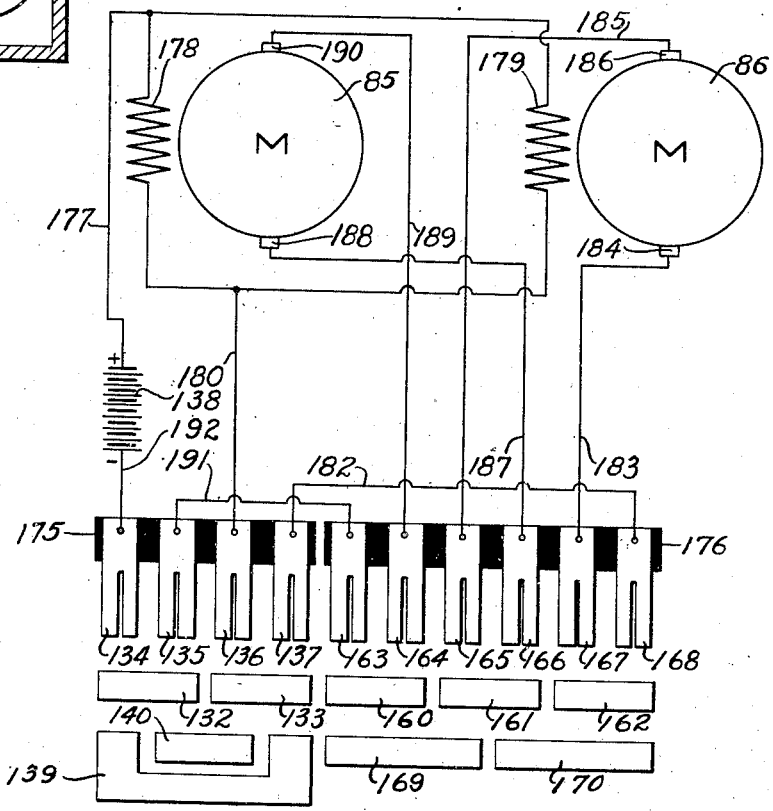
Inventor
Howard B. Scott
By
His Attorneys Patented July 20, 1926.

1,593,194

UNITED STATES PATENT OFFICE.

HOWARD B. SCOTT, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

INDUSTRIAL TRUCK.

Application filed March 20, 1922. Serial No. 545,302.

This invention relates generally to improvements in self-propelled vehicles, and more particularly to apparatus for controlling and propelling such vehicles.

One of the objects of the invention is to provide a light weight, small capacity and high speed industrial vehicle.

Another object of the invention is to provide an industrial vehicle of simple design and desirable construction, and which is efficient in operation.

Another object of the invention is to provide a self-propelled vehicle, of the type which includes a suitable power plant, braking means, a selecting mechanism for controlling the forward and reverse motion of the vehicle, a mechanism to facilitate gradual acceleration of the vehicle by the power plant, and a manually operable foot lever to actuate the mechanism. This device which must be held constantly in certain positions to permit operation of the vehicle and is operable conveniently only by muscular exertion on the part of the operator, said device being automatically operable whenever such exertion is relaxed to apply the brakes, render the power plant ineffective to propel the vehicle and return the mechanism to neutral position, whereby the vehicle is automatically stopped and absolutely prevented from operation until the operator has again moved the device to one of its first mentioned positions.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Of said drawings:—

Fig. 1 is a general front elevation of the truck with parts broken away for clearness.

Fig. 2 is a side elevation of the truck with parts broken away for clearness.

Fig. 3 is a fragmentary longitudinal section of part of the truck.

Fig. 4 is a sectional plan view taken on the line 4—4 of Fig. 2.

Fig. 5 is a section through the switch drums.

Fig. 6 is an end view of the speed switch drum showing the low speed stop pawl.

Fig. 7 is a switch and wiring diagram.

Fig. 8 is a detail plan view of the front axle construction shown partially in section.

Described in general terms, the embodiment of the invention illustrated comprises a self-propelled vehicle having separate motors mounted upon the front axle mechanism to drive the front wheels direct, and switch mechanism located in the forward end of the vehicle to simplify the wiring between the switch mechanism and the motors. There is one switch for controlling the forward and reverse travel of the vehicle, which is operated by a hand lever supported by the steering column, and another switch for controlling the speed of the vehicle, operated by a foot lever which is the power controlling device. When in normal position the foot lever renders the power device ineffective and the braking mechanism effective, to insure the vehicle against carelessness, and accidental or deliberate abuse.

Described in detail, the invention is a self-propelled vehicle having four wheels supporting a frame member 20, the rear end or operator's platform 21 (Figs. 2 and 4) being supported by a square rod 22, which is rounded on each end, forming journals for two wheels 23 and 24. These wheels are retained on the rod by washers 25 and 26, together with cotter pins 27 and 28 respectively.

Securely fastened on the square rod and in position to cooperate with each rear wheel, are brake supporting disks 29 and 30 each having a pin 31 upon which are pivoted two semi-circular brake arms 32 and 33, to which is fastened a brake lining 34

(Fig. 2). In the normal position these arms press the brake lining against the inner surface of the rim of the wheel causing sufficient friction to prevent rotation of the same. The arms are moved to cause this friction by means of a member 35 fastened to a shaft 36 journaled in a bushing 37 supported by the frame member. Fastened to the right hand end of this shaft is an arm 38 having an adjustable link connection 39 with an arm 40 fastened on a rod 41 supported at each end in the frame. The brake mechanism above described is that applied to the left hand wheel, and a similar mechanism is also applied to the right hand wheel, the rod 41 having fastened to it near the right hand end a bell crank lever 42 which has pivoted to its forward end an adjustable link 43. The upper portion of this link has an elongated opening 44 (Fig. 3) to which is freely fitted a pin 45 mounted in an arm 46 fastened to a shaft 47 journaled in a bushing 48 and supported by the frame member. The elongated opening in the links 39 and 43 is for the purpose of causing the brakes to operate at the proper time relatively to the operation of the switch mechanism, which will hereinafter be described.

Attached to the upper end of the bell crank lever 42 is a spring 49 which is constantly under tension, causing the links 39 and 43 to press upward with the lower ends of the openings 44 in contact with the pins 45. This is the normal position of these parts with the brakes effective.

The operator, who stands upon the platform 21, by placing his foot upon a foot lever 50 and pressing downward will cause the rod 41 to rotate in a clockwise direction, and in so doing will release the brakes by allowing the arms 38 and 46 to move in a clockwise direction as the brake arms 32 and 33 are moved toward each other by the action of springs 51 and 52. The foot lever is fastened to the rod by two bolts 53.

The pins 45 in the arms 38 and 46 will continue in contact with the bottom of the slots 44 until the members 35 assume a neutral position with respect to the arms, after which the links continue in their downward movement without further affecting the shafts 36 and 47, the elongated openings 44 providing for this additional movement.

The front end of the truck is supported by a bracket 60 which is securely fastened to the frame member 20 (Figs. 1 and 2). An axle 61 is connected to this bracket by a bolt 62, freely fitted in a bearing 63 in the center of the axle and supported at the front end by two bearings 64 and 65 on the bracket 60 (Fig. 8), and at its rear end screwed into a boss 66 also formed on the bracket. The axle is supported by a brace 67, the center of which is freely connected to the bolt 62 between the boss 66 and a nut 68 which is pinned to the bolt. The forward ends of the brace are fastened to the axle by bolts 69 and 70. The bolt 62 is retained in place by two jam nuts 71.

Mounted in the ends of the front axle are steering knuckles 72 and 73. These steering knuckles are mounted in bearings in the axle and are retained in place by bolts 74 and 75 respectively. The steering knuckles are provided with bearing spindles 76 and 77 to which are freely fitted driving wheels 78 and 79 respectively. The wheels are retained in place on their respective spindles by a washer 80 and cotter pin 81 (Fig 2).

Each front wheel is driven by a separate motor which is adapted to rotate the wheel in either a clockwise or counter clockwise direction, to move the truck backward or forward.

A motor 85 is securely fastened to the steering knuckle 72 to drive the wheel 78, and a similar motor 86 is mounted upon the steering knuckle 73 to drive the wheel 79.

The construction of both driving wheels being similar, a description of one wheel only will be given. The wheel 78 is composed of a main disk 87 (Fig. 2) which has a bearing freely fitted to the spindle 76. A detachable ring 88 which is fastened to the disk 87 cooperates with the disk in securely holding in place a rubber tire 89. Securely fastened to the inside of the disk is a gear 90 which is driven by a pinion 91 fastened on the armature shaft of the motor 85. A guard plate 92 fastened to the steering knuckle is provided with an opening sufficiently large enough to clear the driving pinion 91.

The steering knuckles are connected together by a link 96 (Fig. 4) which causes the front wheels to turn in unison. The right hand end of the link is pivoted to an arm 97 projecting forward from the steering knuckle 73, and the left hand end is pivoted to an arm 98 projecting forward from the steering knuckle 72.

The turning of the front wheels to determine the direction of travel of the truck is controlled by a lever 99 (Fig. 1) which is fastened to the top of a vertical rod 100, encased within a supporting post 101 which is securely fastened to the frame of the truck. The lower portion of the vertical rod is supported by brackets 102 and 103 fastened to the frame.

The lower end of this rod is squared to receive an arm 104 which is securely fastened by a bolt 105. The other end of the arm is pivoted to one end of a link 106 which has its forward end freely connected to the steering knuckle 72 by a bolt 107. The operator by moving the lever 99 forward and backward turns the front wheels to control the direction of travel.

The operator having one hand upon the steering lever places the other hand upon a supporting handle 108 (Fig. 3) which is secured to the upper part of the supporting post 101 by a clamping bolt 109. This handle is equipped with a signal button 110 which may be connected to any suitable signal device.

Located just beneath the steering lever is another lever 115 (Fig. 1) which controls the direction of travel whether it be forward or backward. This lever is fastened near the upper end of a vertical rod 116 which is supported at its upper end by a lug 117 projecting laterally from the handle 108 and at the lower end by the base 118 of the post 101. The rod is held in place by a collar 119 pinned to the rod above the lug 117.

Fastened on the lower end of the vertical rod 116 is an arm 120 (Fig. 4) having one end of a link 121 pivoted thereto by a pin 122. The forward end of the link is pivoted to an arm 123 by a pin 124. This arm is pinned to a horizontal shaft 125 which is journaled in a bearing 126 mounted in the bracket 60. The shaft is retained in place by a pin 127 cooperating with a groove formed in the shaft.

The right hand end of the shaft 125 (Fig. 5) is formed to clutch with the end of a sleeve 128 which is securely fastened to a switch drum 129. This sleeve is journaled in the bracket 60 forming a bearing for the left hand end of the switch drum 129, the right hand end having a sleeve 130 which is secured to the drum and journaled on a shaft 131.

The switch drum 129 which controls the direction of travel is equipped with two sets of contact plates. One set controls the forward travel of the truck and the other set controls the reverse movement. The operator in moving the lever 115 (Fig. 1) forward causes the drum 129 (Fig. 2) to rotate in a clockwise direction, moving contact plates 132 and 133 (Figs. 4 and 7) into engagement with contacts 134, 135, 136 and 137, selecting a circuit between the battery 138 and the motors 85 and 86 to cause them to rotate in a direction to move the truck forward.

When the operator moves the lever 115 backward the drum 129 will move in a counter clockwise direction a sufficient distance to engage two contact plates 139 and 140 with the contacts previously described, selecting a circuit which will cause the truck to move backward when the proper switch is closed.

The operator controls the power for propelling the truck by the foot lever 50, which, when pressed downward about half the entire distance will rock the shaft 41. Pinned to the right hand end of this shaft is an arm 145 (Fig. 3) which extends upward and is pivoted to a horizontal link 146 by a pin 147. This link extends forward to an arm 148 to which it is connected by a pin 149. The arm is pinned to the shaft 131 which is journaled in a bearing 150 and the sleeve 128 (Fig. 5). To this shaft is securely fastened, by a screw 151, a power switch drum 152 which controls the speed of the trunk. This drum, like the other drum 129 is made of wood with metal bushings 153 and 154 fitted to the shaft 131.

Fastened to the drum 152 is a metal band 155 (Fig. 6) having a depression 156 cooperating with a pin 157 projecting from a spring arm 158 to assist the operator in determining the distance to move the foot lever in rotating the power switch drum to the low speed position. The spring arm is fastened at one end to the bracket 60 by screws 159. With the power switch drum in the low speed position, contact plates 160, 161 and 162 are engaged with contacts 163 to 168 inclusive.

To operate the truck at high speed the operator presses the foot lever 50 to its fullest extent of movement, which causes the switch drum 152 to continue its rotation, until contact plates 169 and 170 come into engagement with the contacts 163 to 168 inclusive.

When the lever 115 is moved to the forward position and the foot lever 50 is held in the low speed position, the current flows from the battery 138 through a wire 177, fields 178 and 179 of the motors arranged in parallel, wire 180 connecting the fields with the contact 136, plate 133, contact 137 and a wire 182 connecting contact 137 with speed control contact 168 which connects with contact 167 through the plate 162. From contact 167 the current flows through wire 183 connecting contact 167 with the armature forward terminal 184 and a wire 185 connecting the armature reverse terminal 186 with the speed control contact 165 which connects with contact 166 through the plate 161. From contact 166 the current flows through a wire 187 connecting contact 166 with an armature forward terminal 188 and a wire 189 connecting armature reverse terminal 190 with speed control contact 164 which is connected by a plate 160 to the contact 163. From control 163 the current flows through a wire 191 connecting this contact with the direction control contact 135, which, through the plate 132 connects with the contact 134 which is connected to the battery terminal by a wire 192. In this position of the hand lever 115 and the foot lever 50 the motors are connected in series, which causes the truck to start slowly.

The circuit from the battery to the direction control contact 136 is not affected by the position of the switches and as shown the fields 178 and 179 are always arranged in multiple.

After the truck gets in motion the operator continues the downward movement of the foot lever which disconnects the contact plates 160, 161 and 162 from the contacts 163 to 168, inclusive, and moves into engagement with said contacts, the plates 169 and 170, whereby the contact 168 is connected with contacts 166 and 167 forming a circuit with the two motors in parallel.

To reverse the direction of travel of the truck the operator moves the lever 115 in the opposite direction to that when traveling forward, which causes the contact plates 139 and 140 to engage with the direction control contacts 134 to 137 inclusive. This connects the contact 136 with contact 135 by means of the plate 140, forming the circuit through the wire 191 to the contract 163 which is connected to contact 164 by the plate 160, and the wire 189 connecting contact 164 with the armature reverse terminal 190 of motor 85. From the armature terminal 188 the current flows through the wire 187, contact 166, connecting plate 161, contact 165, and through the wire 185 to the armature reverse terminal 186 of the motor 86, and thence from the armature terminal 184 to the contact 167, which is connected with contact 168 by the plate 162. Contact 168 is connected by the wire 182 to the contact 137 which, engaging with plate 139 connects with contact 134 connected to the battery by the wire 192. The motors in this circuit are connected in series for low speed reverse travel.

In changing from low speed reverse to high speed reverse the operator, by continuing the movement of the foot lever, moves the contact plates 169 and 170 into engagement with speed control contacts 163 to 168 inclusive, which form a circuit with the motors in parallel and operating in reverse direction. The circuit from the battery to contact 163 is the same as for low speed reverse. The contact plate 169 connects contact 163 with contacts 164 and 165 connected respectively with the armature reverse terminal 190 of the motor 85 and the armature reverse terminal 186 of motor 86 by wires 189 and 185. From the forward armature terminals 188 and 184, the current flows through wires 187 and 183 to contacts 166 and 167 connected by the contact plate 170 to contact 168, which is connected to the battery through wire 182, contact 137, contact plate 139, contact 134 and wire 192.

Whenever the operator allows the foot lever to return to normal position the power is automatically cut off and the brakes applied. With the truck at rest and without a driver, the brakes are set so that the truck may be safely left driverless, even on a grade or incline, without danger. Thus the setting of the brakes functions not only to lock the truck rear wheels but also to render the power plant of the vehicle ineffective to propel the truck.

Now, in the operation of the truck, the operator must constantly exercise muscular effort to hold the foot lever in released position, and the lever is so arranged that it cannot readily be operated except by such effort. Should he fail in the exercise of such effort, the brakes will automatically be set and the power switch returned to neutral position so that the truck will be stopped independently of the driver's plan or intent.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:—

1. In a self propelled vehicle, the combination of a power means, driving means normally disconnected from the power means, rotary means manually operated and controlling the speed of said driving means, other manipulative rotary means controlling the direction of travel of the vehicle but ineffective until the first mentioned manipulative rotary means is operated.

2. In a vehicle of the class described, the combination of a power means, driving means normally disconnected from the power means, manipulative rotary means for controlling the speed of said vehicle, and other manipulative rotary means for controlling the direction of travel of said vehicle but ineffective when the speed controlling means is in its neutral position.

3. In a vehicle of the class described, power means, driving means normally disconnected from the power means, a rotatable member for connecting said power means with said driving means, a manipulative device for operating said rotatable member, and flexible means for indicating a certain amount of rotation of said rotatable member.

4. In a vehicle of the class described, power means, driving means normally disconnected from the power means, a rotatable member for connecting said power means with said driving means and controlling the speed of said driving means, having a neutral and intermediate and extreme positions, and flexible means for indicating when said rotatable member is in the intermediate position.

5. In a vehicle of the class described, a power means, driving means, a manipulative means for connecting said power means with said driving means and having a neutral position, an intermediate position and an extreme position and means for retarding rotation of said manipulative means in said intermediate position.

6. In an electrical distribution system, the combination of a plurality of motors, means driven from the motors, a normally operative brake for arresting said means, and a foot-operated means for releasing said brake and connecting the armatures of the motors in series and, upon further movement, in parallel.

In testimony whereof I affix my signature.

HOWARD B. SCOTT.